Sept. 27, 1960 | B. DIGGINS ET AL | 2,954,443

KNOB SWITCH

Filed Aug. 2, 1957 | 3 Sheets-Sheet 1

INVENTORS
Bartholomew Diggins and
Robert E. LeBlanc
BY Diggins & LeBlanc
ATTORNEYS Sept. 27, 1960 B. DIGGINS ET AL 2,954,443

KNOB SWITCH

Filed Aug. 2, 1957 3 Sheets-Sheet 2

INVENTORS
Bartholomew Diggins and
Robert E. LeBlanc
BY Diggins & LeBlanc
ATTORNEYS Sept. 27, 1960 B. DIGGINS ET AL 2,954,443

KNOB SWITCH

Filed Aug. 2, 1957 3 Sheets-Sheet 3

INVENTORS
Bartholomew Diggins and
Robert E. LeBlanc

BY Diggins & LeBlanc

ATTORNEYS

United States Patent Office 2,954,443

Patented Sept. 27, 1960

2,954,443

KNOB SWITCH

Bartholomew Diggins, Kensington, and Robert E. Le Blanc, Silver Spring, Md., assignors to American Research Bureau, Inc., Washington, D.C., a corporation of Delaware Filed Aug. 2, 1957, Ser. No. 675,938

7 Claims. (Cl. 200—11)

This invention relates to a switch and more particularly relates to a switch adapted to be associated with the tuning knob of a wave signal receiver for controlling indicating or recording equipment for indicating or recording information relating to the tuning condition of the associated receiver.

In recent years it has become increasingly important for radio and television advertisers to be able to determine the listening habits of wave signal receiver users so as to analyze the effectiveness of radio and television advertising. While numerous schemes have been employed for this purpose, it is now generally agreed that instrumented methods of determining the listening or viewing habits of users is the only satisfactory way of obtaining accurate information. In many cases it is desirable that the information with respect to the tuning of wave signal receivers be instantaneously available at a central station or at a central point remote from the place or places where the receivers are located. This permits the analysis organization which controls such central station or central point and which prepares an analysis of the listening or viewing habits of wave signal receiver users to have the information to prepare reports with a minimum of delay.

Various types of widely differing instrumented systems for securing this information have been proposed. However, despite the variation of the proposed systems, it is always necessary for some control signal or some intelligence to be derived from the wave signal receiver itself in order to indicate its tuning condition. In the case of superheterodyne circuits, it frequently has been proposed to derive a control signal from the local oscillator. In other cases it has been proposed to either mechanically or electrically provide a control signal in accordance with the mechanical position of the tuner in the wave signal receiver. In many cases a mechanical link has been connected to the tuning shaft of the wave signal receiver and this used to mechanically actuate a suitable position switch, the various positions of which are indicative of particular transmitting stations to which the receiver is tuned.

In the case of television receivers numerous problems are presented in using the position of the tuner to derive a control signal. In the first case, the channel selector shaft of most commercial television receivers is the inner shaft of a pair of concentric control shafts, with the outer shaft being normally used to control suitable trimmer condensers or the like. Since the television receivers on the market are manufactured by a large number of different manufacturers, are of numerous different designs, are mounted in different types of cabinets, include different types of tuners, and utilize different types of tuning knobs, it is extremely difficult to provide a single type of mechanical tuner take-off which is adapted to easy mounting on all television receivers. As a result of this difficulty it has been proposed that a control signal be provided through the use of a switch contained in a knob which may be substituted for the conventional knob on the television tuner. One such switch of this type is shown in Krahulec et al. Patent No. 2,751,449.

All of the previously proposed television knob switches of which we are aware involve the use of a series of stationary contacts spaced radially and concentrically about the television tuner shafts. These contacts are selectively connected to a conducting ring, which also concentrically surrounds the shafts, by a bridging contact which is carried by the tuner control knob. While this system is generally satisfactory it entails the use of a continuously wiping contact which tends to wear with a concomitant possibility of faulty contact.

According to the present invention it has been found that a knob actuated switch may be provided without the use of a knob-carried continuous wiping contact. According to our invention we provide a station selector knob controlled switch which, upon rotation, either opens or closes individual switches to provide a control signal suited to indicating the tuning condition of the wave signal receiver to which it is attached.

It is accordingly a primary object of the present invention to provide an improved type of knob actuated switch for indicating the tuning condition of wave signal receivers capable of substantial universal application to wave signal receivers regardless of the manufacturer.

It is another object of the invention to provide an improved knob actuated position switch capable of providing a control signal for indicating the tuning condition of a wave signal receiver to which it is attached.

It is another object of the invention to provide a knob type switch of the foregoing type which is relatively simple in construction and low in cost and which provides a reliable switching function.

These and further objects and advantages of the invention will become more apparent upon reference to the following specification and claims and appended drawings wherein:

The switch of this invention basically consists of an annular switch assembly which is secured to the panel or front of a television receiver with the concentric tuner shafts of the receiver extending therethrough. A movable knob is mounted on the inner tuner shaft to control the position of the shaft and thus the channel to which a television receiver is tuned. This knob member carries a suitable mechanical means for actuating the switch assembly.

Figure 1:
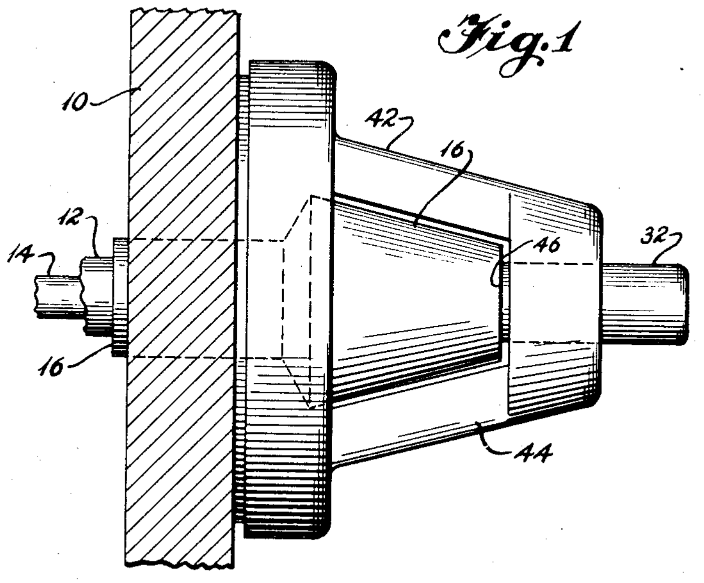
Figure 1 is a side elevation partly in section showing a switch constructed according to the present invention attached to the tuner shaft of a conventional television receiver.
Figure 2:
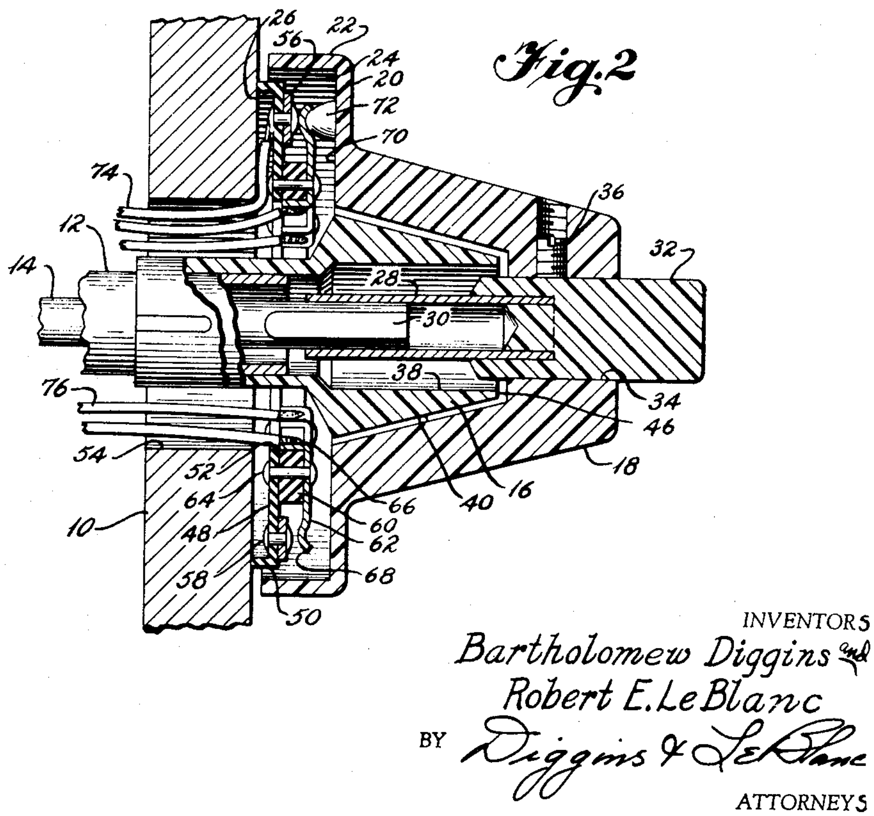
Figure 2 is a vertical section of the switch of Figure 1.
Figure 3:
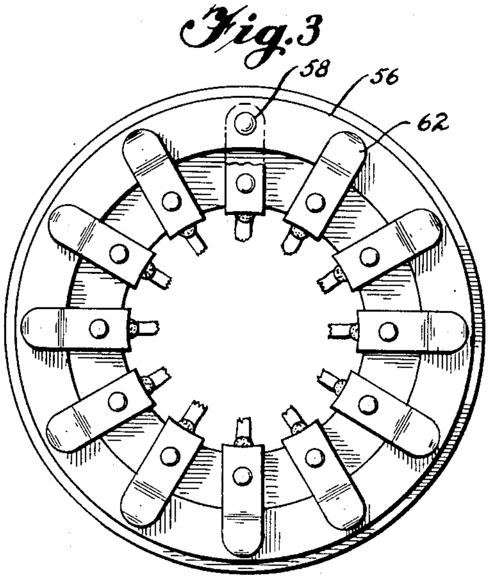
Figure 3 is a plan view, partially in section, showing the switching contacts of the switch of Figures 1 and 2.

Referring to Figures 1, 2 and 3, there is seen the front panel 10 of a conventional television receiver through which concentric tuner shafts 12 and 14 extend. The inner shaft 14 normally controls the channel selector which is conventionally a 12 position switch which detents into each position. The outer shaft 12 normally provides trimmer tuning and may be driven by means of a suitable fine tuning knob 16. In accordance with the present invention the channel selector knob supplied with the television receiver is removed and replaced with a selector knob 18 which is generally similar in appearance to the knob which it replaces. The knob 18 differs from the conventional television receiver knob in that its base 20 is provided with a peripheral flange 22 to form a housing 24 for the annular switch assembly 26.

Because of the peripheral flange 22 and space 24 the knob 18 is disposed farther from the face of the television receiver panel than was the conventional knob which it replaced. Accordingly some provision must be made for effecting a connection to the inner tuner shaft 14. This may be accomplished by means of a tube 28 having one flattened side to mate with a flat side 30 on the inner tuner shaft 14 to lock the tube thereon in a conventional manner. The outer end of the tube is received within a plastic cylindrical member 32 which passes through an aperture 34 in the front of knob 18. Knob 18 is locked to the member 32 by means of a set screw 36. The tube 28 and plastic cylindrical member 32 pass through a bore 38 in the inner knob 16 while the inner knob 16 is in turn received in a cutaway portion 40 in the outer knob 18. This cutaway portion 40 is formed by a pair of arms 42 and 44 having a width less than the diameter of the outer end 46 of the small knob 16, to permit ready operation of the small knob.

The stationary switch assembly 26 consists of an annulus 48 having an outer peripheral flange 50 which engages the face of the television receiver panel 10 for securement thereto by adhesive or otherwise. The inner edge 52 of the annulus 48 may be aligned with the aperture 54 in the television receiver panel through which the tuner shafts extend.

A metal ring 56 is secured to the annulus 48 by means of a plurality of rivets 58 which are equally spaced circumferentially about the ring and which are equal in number to the detent positions of the television receiver tuner, i.e., to the number of channels to which the receiver may be tuned. Opposite each rivet 58 there is mounted on the annulus 48 a small block 60 of insulating material which carries a contact finger 62. Each contact finger 62 and its associated block 60 is secured to the annulus 48 by means of a rivet 64. The inner end of the contact finger 62 is bent downwardly over the edge of the block 60 as shown at 66. The outer end of the contact finger is provided with a depression or detent 68 situated immediately above the associated rivet 58.

The under surface 70 of the knob 18 which forms one wall of the housing 24 carries a nipple 72 which is of such a size as to force a contact finger 62 downwardly into firm electrical contact with its associated rivet 68 whenever the nipple 72 is in position over the contact finger. This position of a contact finger is illustrated in the upper half of the switch in Figure 2. A connection to the ring 56 is established by a lead 74 which may be soldered to the head of one of the rivets 58. Connections may be made to the contact fingers 62 by means of leads 76 having end soldered to the downturned flanges 66 on the contact fingers.

The operation of the switch of the invention will be apparent from the foregoing description. In mounting the device on a television receiver, the channel selector knob and trimmer knob originally supplied with the receiver are removed. The switch assembly 26 is then mounted over the concentric tuner shafts 12 and 14 and is secured to the face of the television receiver front panel by means of an adhesive or other suitable means. The connections to the ring 56 and contact finger 62 have been previously made and the leads 74 and 76 are brought into the interior of the television receiver cabinet through the aperture 54 in the front panel thereof. The inner or vernier knob 16 is then mounted on the outer concentric tuner shaft 12 and the tube 28 is attached to the inner concentric tuner shaft 14. The outer knob 18 is thereupon inserted over the cylindrical member 32 extending from the tube 28 and is secured thereto by means of the set screw 36. After this operation has been completed the appearance and operation of the television receiver is substantially unchanged, but tuning of the receiver now effects a closing of a selected switch each time that a new channel is selected. The rotational positions of the switch assembly 26 and outer knob 30 are adjusted so that the nipple 72 depresses and closes a switch each time that the tuner detents to a specific channel. That is to say, each time that a channel is selected, one of the switches on the switch assembly is closed.

Figure 4:
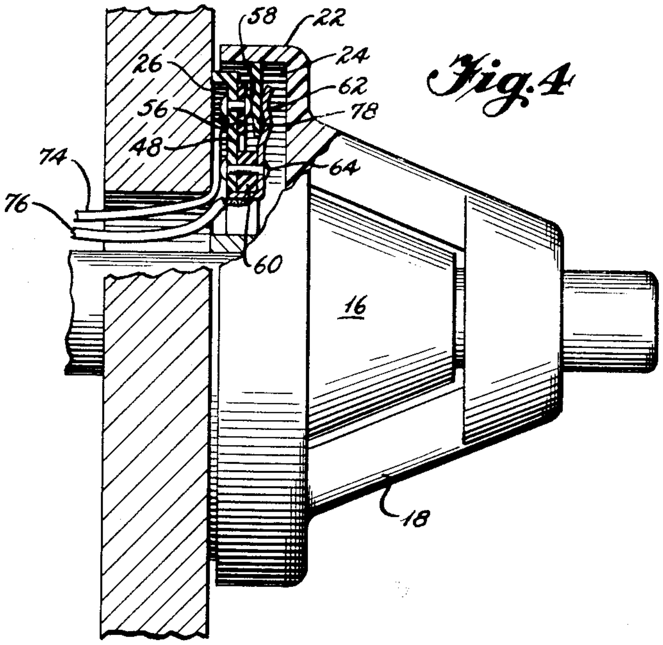
Figure 4 is a vertical elevation, partly in section, showing another embodiment of the switch of the invention.

While the embodiment of the invention shown in Figures 1, 2 and 3 provides a switch which closes a circuit each time that a new channel is selected, our invention also comprehends the provision of a knob type switch arranged to open a normally closed circuit each time that a channel is selected. A switch of this type is generally similar to that illustrated in Figures 1 through 3 and is shown in Figure 4. The same reference numerals are utilized in Figure 4 as in Figures 1 through 3 where they indicate identical parts. Thus referring to Figure 4, it will be seen that an outer knob 18, similar to that shown in Figures 1 through 3, is associated with an inner knob 16, with the outer knob being provided with a peripheral skirt 22 defining a housing. A switch assembly 26 comprising an annulus 48 is secured to the front panel of the television receiver about the tuner shaft and carries a ring 56 secured to the annulus 48 by rivets 58. A series of contact fingers 62 are mounted on blocks 60 and are secured to the annulus 48 by rivets 64. Connections are made to the ring 56 and contact fingers 62 by connectors 74 and 76 respectively.

In contrast to the embodiment of the invention shown in Figures 1 through 3, the contact fingers 62 normally are biased by their resiliency into contact with the heads of rivets 58 so that each contact finger normally establishes a circuit to the ring 56. The peripheral skirt 22 of the outer knob 18 carries an insulating finger 78 of substantially the same width as the contact fingers 62. This contact finger 78 is provided with rounded edges so that upon rotation of the knob 18 the finger 78 slides between contact fingers 62 and their associated rivets 58 to open the circuit therebetween. It will thus be seen that in this embodiment of the invention all circuits between contact fingers 62 and their associated rivets are normally closed, with the exception of one circuit which is held open by means of the finger 78. In mounting this embodiment of knob control switch on the receiver, the knobs and switch assembly are so positioned that the finger 72 opens one circuit each time that the tuner detents to a channel position.

While the foregoing embodiments of the invention have disclosed control switches which either close or open individual switches selectively as the tuner of a television receiver is rotated to select individual channels, our invention also comprehends the provision of a knob type switch which is adapted to sequentially and cumulatively close (or open) circuits so that where, as an example, the switch is provided with a number of individual switches equal to the number of channels which may be selected by the television tuner, the number of closed switches is proportional to the number of the channel selected. That is to say, as an illustration, if a television receiver tuner tunable consecutively to channels 2 through 13 is positioned at channel 2, one switch or circuit is closed. If the tuner is positioned at channel 3, two switches or circuits are closed; if the tuner is positioned at channel 7, six switches or circuits are closed; etc.

Figure 5:
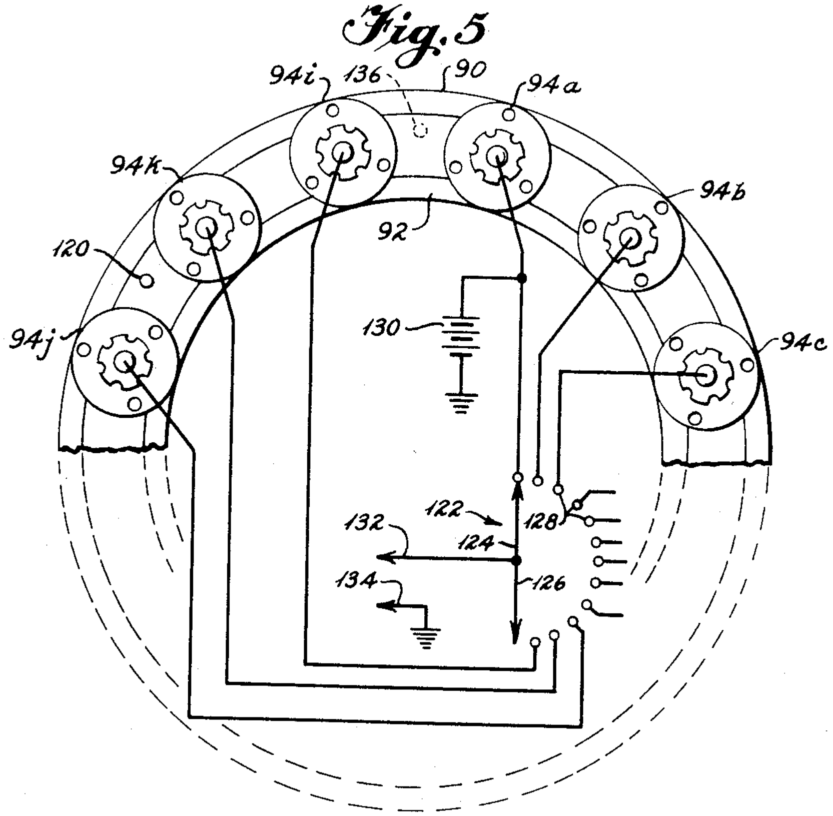
Figure 5 is a partial plan view of the switching arrangement according to still another embodiment of the invention.
Figure 6:
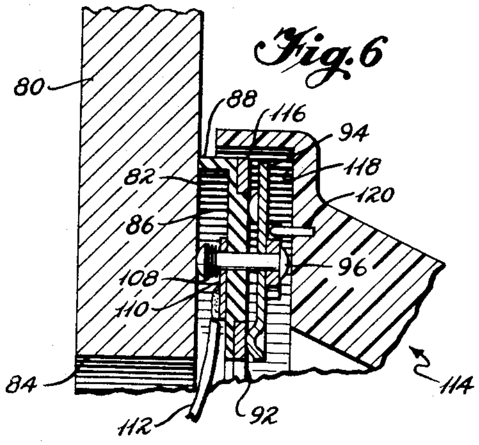
Figure 6 is a partial vertical section of the switch of Figure 5.
Figure 7:
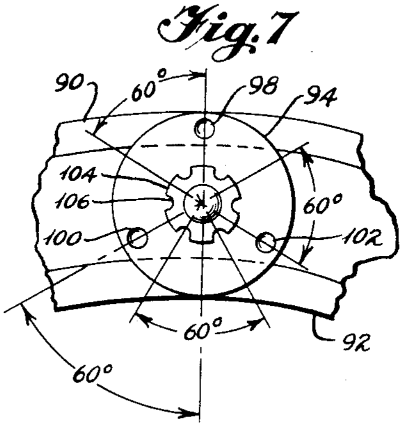
Figure 7 is a partial plan view of one of the switch plates of the switch of Figures 5 and 6.

A switch capable of performing this function is shown in Figures 5 through 7 and is constructed similar to the switches described in the preceding two embodiments of the invention. Since the mechanical arrangements are similar, only the features of this embodiment which differ from the features of the preceding embodiments will be discussed in detail.

tuner shaft exceeds 360°. When the shaft rotates in one direction the number of connections is increased. When it rotates in an opposite direction the number of connections is decreased.

It will be apparent from the foregoing that according to our invention we have provided a knob type switch which is controlled by the actuation of a television receiver or similar tuner, but which does not require an electrical contact to be carried by any movable part associated with the tuner shaft. According to our invention the switch is completely divorced from the knob which actuates the tuner shaft except for a mechanical actuator which closes or opens stationary switch contact.

The invention may be embodied in other specific forms without departing from the spirit or essential characteristics thereof. The present embodiments are therefore to be considered in all respects as illustrative and not restrictive, the scope of the invention being by the appended claims rather than by the foregoing description, and all changes which come within the meaning and range of equivalency of the claims are therefore intended to be embraced therein.

What is claimed and desired to be secured by United States Letters Patent is:

1. In a system for determining the tuning condition of a television receiver having a pair of coaxially arranged tuning shafts, the inner of which is a station selector shaft and which shafts are provided with separate knobs mounted outside of the cabinet of said receiver; a switch, means for supporting said switch from the outside of said receiver cabinet between said cabinet and said knobs, said switch including a plurality of contacts movably mounted thereon and associated with a stationary contact means thereon, an actuating means adapted to selectively engage said movable contacts, and means operatively relating said actuating means to said inner station selector shaft whereby movement of said inner station selector shaft causes selective movement of said movable contact, said contact means comprising a pair of concentric contact rings, said movable contacts being selectively engageable with said inner and outer rings upon actuation by said actuating means.

2. In a system as set out in claim 1, said movable contact means being mounted for rotation on centers between said contact rings.

3. In a system as set out in claim 1, said actuating means comprising a member carried by said knob which controls said inner tuning shaft.

4. In a system for determining the tuning condition of a television receiver having a pair of coaxially arranged tuning shafts, the inner of which is a station selector shaft and which shafts are provided with separate knobs mounted outside of the cabinet of said receiver; a switch, means for supporting said switch from the outside of said receiver cabinet between said cabinet and said knobs, said switch including a plurality of contacts movably mounted thereon and associated with a stationary contact means thereon, non-conducting actuating means adapted to selectively engage said movable contacts, and means operatively relating said actuating means to the knob on said inner station selector shaft whereby movement of said inner station selector shaft causes selective movement of said movable contacts, said knob on said inner station selector shaft carrying skirt means enclosing the exposed surfaces of said contacts and contact means and said actuating means, said movable contacts being rotatable and being rotated when said actuating means engages said contacts and is moved relative thereto to alter their mechanical and electrical relationship with respect to its corresponding stationary contact which relationship persists until said movable contacts are re-engaged by said actuating means.

5. In a system for determining the tuning condition of a wave signal receiver having a tuning shaft extending from the cabinet thereof and having a control knob on said shaft, switch means affixed to said cabinet between said cabinet and said knob, said switch means having fixed continuous contact means and movable contact means all affixed to said cabinet, said movable contact means being spaced around the entire circumference of said shaft, a plurality of connectors associated with said switch means, and actuating means associated with said knob for cooperating with said movable contact means to sequentially and accumulatively establish electrical connection between one of said plurality of connectors and the remainder of said connectors through said fixed contact means, said actuating means connecting a number of said connectors to said one connector, said connectors forming parallel circuits with said one connector after being actuated by said actuating means, said number being a function of the amount of rotation of said tuning shaft and increasing as said tuning shaft is rotated in one direction and decreasing as said shaft is rotated in the opposite direction.

6. In a system as set out in claim 5, all of said remaining connectors being disconnected from said one connector when said tuning shaft is rotated beyond 360°.

7. In a system as set out in claim 5, said movable contact means comprising a plurality of spaced contacts each pivoted about an axis through its center.

References Cited in the file of this patent

UNITED STATES PATENTS

| | | |
|---|---|---|
| 2,489,124 | Giovanni | Nov. 22, 1949 |
| 2,528,345 | De Champs | Oct. 31, 1950 |
| 2,545,837 | Berthiez | Mar. 20, 1951 |
| 2,751,449 | Krahulec | June 19, 1956 |

FOREIGN PATENTS

| | | |
|---|---|---|
| 458,446 | Great Britain | Dec. 21, 1936 |
| 665,200 | Germany | Sept. 20, 1938 |
| 768,387 | Great Britain | Feb. 13, 1957 |

Referring to Figures 5, 6 and 7, and particularly to Figure 6, a television receiver panel 80 has a switch assembly 82 secured thereto concentrically with an opening 84 through which the tuner shafts extend. As in the preceding embodiments of the invention, the switch assembly 82 consists of an annulus 86 having a depending peripheral flange 88 which engages and is secured to the cabinet of the television receiver. The annulus 86 carries at its outer edge a first metal ring 90 which is mounted flush with the top of the annulus. A second concentric ring 92 is carried at the inner edge of the annulus 86 and is also mounted flush with the top thereof.

Associated with the switch assembly and annulus 86 are a plurality of metal discs 94 which are equally spaced about the switch assembly and which are equal in number to the positions of the television tuner. The discs 94 are pivoted to the annulus 86 midway between the rings 90 and 92 by means of rivets 96. The diameter of the discs is substantially equal to the distance between the outer periphery of the outer ring 90 and the inner periphery of the inner ring 92, so that the discs overlie portions of the outer and inner rings 90 and 92.

Referring to Figure 7, each disc 94 is provided with detents or nipples 98, 100 and 102 removed 120° from one another and positioned at the outer edge of the disc. It is seen that when one detent 98 is in contact with the outer ring 90, the other two detents 100 and 102 are out of contact with the inner ring 92. Each disc 94 carries at the top thereof a drive disc 104 which is provided with six equally spaced slots 106 around its periphery. The drive discs may be formed as integral portions of the metal discs 94, or may be formed separately and secured thereto in any suitable manner, such as by means of an adhesive. The slots 106 are spaced apart from another by 60° and are removed from the angular positions of the detents 98, 100 and 102 by 30°. Referring to Figure 7 it will be seen that when the disc 94 is rotated 60° in either direction from the position shown in Figure 7, one of detents 100 or 102 will make contact with the inner ring 92, while detent 98 is carried out of the contact with the outer ring 90. Successive rotation of the discs 94 thus alternatively establishes contact between the rivet 96 on which the disc is mounted and the inner and outer rings 90 and 92. The rivet 96 extends through the drive disc 104, and disc 94 and through the annulus 86. A coil spring 108 applies a force to the lower head of the rivet to maintain the disc 94 in firm contact with the rings 90 and 92. A lug 110 is mounted over the rivet 96 between the spring 108 and the underside of the annulus 86 to provide for an electrical connection to the rivet 96. This connection may be made by a suitable connector 112.

An outer knob 114, shown only fragmentarily in Figure 6, having a peripheral flange 116 encompasses the switch assembly 82 as in the preceding embodiments of the invention. The underface 118 of the housing formed by the peripheral flange 116 has protruding therefrom a pin 120 which is mounted at a distance from the axis of rotation of the tuning shaft which causes the pin to engage the outermost slots 106 in the drive discs 104 associated with the metal discs 94 as the tuning knob 114 is rotated. Referring to Figure 7, it will thus be seen that when the tuning knob is rotated past the disc shown, the pin 120 engages the uppermost slot 106 to the right or to the left of the vertical center line, depending upon the direction of the rotation of the knob 114, and rotates the drive disc and the metal disc 94 through 60° to open the contact between the disc and the outer ring and to close the contact between the disc and the inner ring. This occurs regardless of the direction of rotation of the knob 114.

Referring to Figure 5 the upper half of the switch assembly is shown as it may be connected to a stepper switch 122. The stepper switch 122 is of a conventional type having a pair of movable arms 124 and 126 associated with a plurality of stationary contacts 128. The switch assembly has a plurality of discs **94*a*, 94*b*, 94*c*, 94*j*, 94*k*, 94*i* mounted over inner and outer rings 90 and 92. The knob 114 and switch assembly 82 are so positioned on the television receiver that the pin 120 carried by the knob 114 is intermediate between two discs 94 when the tuning shaft of the television receiver is detented to a channel. Also, all of the discs 94 are initially turned to a position in which they establish contact with the same ring, such as the outer ring 90**.

The rivets 96 associated with the discs 94 in Figure 5 are respectively connected to the contacts 128 of the stepper switch 122. The rivet of the first disc **94*a* is also connected to a source of power supply indicated as a battery 130 whose other terminal is connected to ground. The output from the unit is provided on leads 132 and 134, the lead 134 being also grounded. The switch shown in Figure 5 provides for the twelve positions currently utilized on television receivers, with the disc 94*a* being associated with channel 2 and the remaining discs in a clockwise direction being sequentially associated with channels 3 through 13**.

In mounting the switch on the television receiver, the tuner is set to channel 13 so that the pin 120 is in the dotted position shown at 136. The discs 94 are all initially placed so as to contact the outer ring 90 and the knob 114 is secured to the tuner shaft so that the pin 136 is midway between discs **94*i* and 94*a* as shown at 136. If the knob 114 is now rotated to carry the tuner to channel 11, the pin 120 will be in the position shown by the solid line between discs 94*j* and 94*k*. In reaching this position, the pin will have rotated discs 94*a*, 94*b*, 94*c*, 94*d*, 94*e*, 94*f*, 94*g*, 94*h*, 94*i* and 94*j* 60° to break the contact between these discs and the outer ring 90 and to establish contact between these discs and the inner ring 92. With the switch at this position, it will thus be seen that a voltage is presented on leads 132 and 134 for each of the discs 94*a*, 94*b*, 94*c*, 94*d*, 94*e*, 94*f*, 94*g*, 94*h*, 94*i*, and 94*j*, whereas no voltage is presented for discs 94*k* and 94*l*. If the knob 114 is now rotated in a clockwise direction to advance one channel to channel 12, disc 94*k* will be rotated in a clockwise direction to make contact with the inner ring 92 and to thus place voltage on its associated stationary contact in stepper switch 122. If, on the other hand, the knob 114 is rotated in a counterclockwise direction to channel 10, disc 94*j* will be rotated in a counterclockwise direction to break the contact with the inner disc 92 and make contact with the outer disc 90. This removes the voltage from its associated stationary contact on stepper switch 122**.

Consider now the action when the knob 114 is rotated so as to carry the pin 120 clockwise past the disc **94*a* associated with channel 2. At the time that the pin 120 reaches the position shown at 136 moving in a clockwise direction, all rivets associated with all discs 94 are connected to the battery 130 so that all stationary terminals 128 in stepper switch 120 have voltage applied thereto. When the pin 120 passes disc 94*a* associated with channel 2, however, this disc is rotated 60° so as to disconnect it from the inner ring 92 to which all of the other discs are connected. The voltage circuit to all of the other discs is thus broken and the only stationary stepper switch contact 128 having voltage thereon is the contact associated with the disc 94*a*. If, after passing disc 94*a* associated with channel 2, the control knob 114 is then reversed in direction and moved back to the position 136 disc 94*a* is rotated in a counterclockwise direction so as to again connect the battery to the inner ring 92 and to connect all stationary contacts 128 in stepper switch 122 to the voltage source. The position 136 of the pin 120 is, of course, the channel 13** position.

It will be apparent that with this embodiment of switch it is possible to establish sequential and cumulative contact between a plurality of connectors and one connector, with the number of connections being a function of the position of the tuner shaft. This same switch then breaks all such connections but one when rotation of the